(12) United States Patent
Chiba et al.

(10) Patent No.: US 11,928,208 B2
(45) Date of Patent: Mar. 12, 2024

(54) CALCULATION DEVICE, CALCULATION METHOD, AND CALCULATION PROGRAM

(71) Applicant: NIPPON TELEGRAPH AND TELEPHONE CORPORATION, Tokyo (JP)

(72) Inventors: Daiki Chiba, Musashino (JP); Yuta Takata, Musashino (JP); Mitsuaki Akiyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 476 days.

(21) Appl. No.: 17/280,186

(22) PCT Filed: Apr. 16, 2019

(86) PCT No.: PCT/JP2019/016375
§ 371 (c)(1),
(2) Date: Mar. 26, 2021

(87) PCT Pub. No.: WO2020/070916
PCT Pub. Date: Apr. 9, 2020

(65) Prior Publication Data
US 2021/0357500 A1     Nov. 18, 2021

(30) Foreign Application Priority Data
Oct. 2, 2018   (JP) .................. 2018-187723

(51) Int. Cl.
*G06F 21/55* (2013.01)
*G06N 20/00* (2019.01)

(52) U.S. Cl.
CPC .......... *G06F 21/552* (2013.01); *G06F 21/554* (2013.01); *G06N 20/00* (2019.01); *G06F 2221/034* (2013.01)

(58) Field of Classification Search
CPC .............. G06F 21/552; G06F 21/554; G06F 2221/034; G06N 20/00
See application file for complete search history.

(56) References Cited

U.S. PATENT DOCUMENTS

| 8,839,418 B2 | 9/2014 | Hulten et al. |
| 11,748,610 B1 * | 9/2023 | Majumder .......... G06F 9/45558 706/12 |

(Continued)

FOREIGN PATENT DOCUMENTS

| JP | 2014-93027 A | 5/2014 |
| JP | 6196008 A | 9/2017 |

(Continued)

OTHER PUBLICATIONS

International Search Report and Written Opinion dated Jul. 16, 2019, received for PCT Application PCT/JP2019/016375, filed on Apr. 16, 2019, 9 pages including English Translation.

(Continued)

*Primary Examiner* — Stephen T Gundry
(74) *Attorney, Agent, or Firm* — XSENSUS LLP

(57) ABSTRACT

A calculation device receives input of a plurality of pieces of training data including a communication destination known to be malignant as data. The calculation device generates a model that calculates a malignant degree of an input communication destination from each piece of the training data. The calculation device gives weight to each of the models, and generates a mixed model using the model and the weight. The calculation device calculates a malignant degree of a communication destination unknown whether the communication destination is malignant using the mixed model.

16 Claims, 8 Drawing Sheets

(56) References Cited

U.S. PATENT DOCUMENTS

| | | |
|---|---|---|
| 2018/0197105 A1 | 7/2018 | Lou et al. |
| 2018/0270254 A1 | 9/2018 | Chiba et al. |
| 2021/0012247 A1* | 1/2021 | Shiraki .................. G06N 20/20 |
| 2021/0157909 A1* | 5/2021 | Yamamoto .............. G06F 11/34 |
| 2021/0182077 A1* | 6/2021 | Chen .................. G06Q 30/0241 |
| 2021/0203660 A1* | 7/2021 | Nagayama ............ H04L 63/101 |
| 2021/0203686 A1* | 7/2021 | Kazato ................ H04L 63/1408 |
| 2021/0223765 A1* | 7/2021 | Nakabayashi ....... G05B 23/027 |
| 2021/0224664 A1* | 7/2021 | Kisamori ................ G06F 30/27 |
| 2021/0232737 A1* | 7/2021 | Kisamori ............... G06Q 10/04 |
| 2021/0232738 A1* | 7/2021 | Kisamori ............... G06N 20/10 |
| 2021/0232957 A1* | 7/2021 | Kisamori ............... G06N 20/10 |
| 2021/0241119 A1* | 8/2021 | Takahashi .............. G06N 3/045 |
| 2021/0250260 A1* | 8/2021 | Yamada .............. H04L 63/1441 |
| 2021/0256402 A1* | 8/2021 | Yamanaka ............. G06N 20/00 |
| 2021/0271755 A1* | 9/2021 | Yamanaka ............ G06F 21/567 |
| 2021/0273964 A1* | 9/2021 | Izumi .................... G06F 21/554 |
| 2021/0319880 A1* | 10/2021 | Tomii ..................... G16H 50/70 |
| 2021/0327456 A1* | 10/2021 | Yamaguchi ............. G06N 3/045 |
| 2021/0327543 A1* | 10/2021 | Sato ........................ G01N 33/15 |
| 2022/0188700 A1* | 6/2022 | Khavronin ......... G06Q 30/0201 |
| 2023/0024840 A1* | 1/2023 | Chen ...................... G06N 3/063 |
| 2023/0161843 A1* | 5/2023 | Ghanta .................. G06F 17/18 |
| | | 706/12 |

FOREIGN PATENT DOCUMENTS

| | | |
|---|---|---|
| WO | 2016/140038 A1 | 9/2016 |
| WO | 2017/049042 A1 | 3/2017 |
| WO | 2018/164701 A1 | 9/2018 |

OTHER PUBLICATIONS

Uchiyama et al., "Combining Multiple Classifiers Using Certainty Factor Estimation.", SIG-KBS-803, 2009, pp. 33-38.

* cited by examiner

FIG.2

| SERIAL NUMBER | LABEL | TYPE | COMMUNICATION DESTINATION |
|---|---|---|---|
| 1 | BENIGNANCY | DOMAIN NAME | foo.example.com |
| 2 | MALIGNANCY | DOMAIN NAME | bar.example.net |
| ... | ... | ... | ... |
| 101 | BENIGNANCY | URL | http://foo.example.com/abcdef/index.php?test=123 |
| 102 | MALIGNANCY | URL | http://bar.example.net/index.php?num=2 |
| ... | ... | ... | ... |
| 201 | MALIGNANCY | IP ADDRESS | 192.0.2.101 |
| 202 | BENIGNANCY | IP ADDRESS | 203.0.113.202 |
| ... | ... | ... | ... |

FIG.3

| SERIAL NUMBER | COMMUNICATION DESTINATION |
|---|---|
| 1 | www.example.com |
| 2 | foo.example.com |
| ... | ... |

FIG.4

| SERIAL NUMBER | COMMUNICATION DESTINATION | MALIGNANT DEGREE |
|---|---|---|
| 1 | www.example.com | 0.3 |
| 2 | foo.example.com | 0.4 |
| ... | ... | ... |

CALCULATION DEVICE, CALCULATION METHOD, AND CALCULATION PROGRAM

CROSS-REFERENCE TO RELATED APPLICATIONS

The present application is based on PCT filing PCT/JP2019/016375, filed Apr. 16, 2019, which claims priority to JP 2018-187723, filed Oct. 2, 2018, the entire contents of each are incorporated herein by reference.

FIELD

The present invention relates to a calculation device, a calculation method, and a calculation program.

BACKGROUND

Attackers carrying out cyberattacks on the Internet use communication destinations represented by uniform resource locators (URLs), domain addresses, and Internet protocol (IP) addresses for a process of carrying out the attacks or achievement of goals. For example, an attacker locates malignant software called malware in a server on the Internet, and sets a communication destination represented by a URL, a domain address, and an IP address as an identifier of the server and the software. There are an attack case in which a user accesses the communication destination and has malware infection and an attack case in which a user is made to access the communication destination after malware infection and information leak is generated.

Conventionally, as countermeasures against cyberattacks, an action in which communication destinations (hereinafter, malignant communication destinations) that are represented by URLs, domain addresses, and IP addresses used for attacks are specified, and are monitored and blocked on communication routes has been generally taken. For example, a countermeasure of filtering communication from a user to a malignant communication destination on a cache domain name system (DNS) server located in a local network and an Internet service provider (ISP) and a countermeasure of filtering communication from a user to a malignant communication destination in security appliances represented by an intrusion detection system (IDS), an intrusion prevention system (IPS), and a deep packet inspection (DPI) located in a local network have been taken.

Malignant communication destinations used for these kinds of countermeasures are specified by intentionally generating malware infection with decoy systems represented by a honey pot and by actually operating malware with malware analysis systems represented by a sandbox. In addition, in order to complement malignant communication destinations that cannot be observed and specified with these systems, the following action has been taken: training models are generated with a machine learning method using already specified known malignant communication destinations as training data and the malignant degree of test data formed of new communication destinations is calculated using the generated training models so as to specify new malignant communication destinations (for example, see Patent Literature 1).

CITATION LIST

Patent Literature

Patent Literature 1: Japanese Patent No. 6196008

SUMMARY

Technical Problem

The conventional technique has, however, the problem that it may be difficult to specify malignant communication destinations with high accuracy when the malignant communication destinations are changed. In this case, attackers may change malignant communication destinations one after another in order to avoid specifying the malignant communication destinations. Every time malignant communication destinations are changed, data of new malignant communication destinations is generated.

For example, according to the technique described in Patent Literature 1, a model in which data of the latest malignant communication destination is defined as training data can be generated. By contrast, in the data of the latest malignant communication destination, a deviation may occur and sufficient information for improving accuracy of the model is unlikely to be included. In such cases, it is considered that the technique described in Patent Literature 1 cannot improve accuracy of a model sufficiently.

Solution to Problem

To solve a problem and to achieve an object, a calculation device includes: an input unit that receives input of a plurality of data sets including a communication destination known to be malignant as data; a first generation unit that generates a model calculating a malignant degree of an input communication destination from each of the data sets; and a second generation unit that gives weight to each of the models and generates a mixed model using the model and the weight.

Advantageous Effects of Invention

According to the present invention, even when a malignant communication destination is changed, the malignant communication destination can be specified with high accuracy.

BRIEF DESCRIPTION OF DRAWINGS

FIG. 2 is a view illustrating an example of training data according to the first embodiment.

FIG. 3 is a view illustrating an example of a target communication destination list according to the first embodiment.

FIG. 4 is a view illustrating an example of the malignant degree of target communication destinations according to the first embodiment.

DESCRIPTION OF EMBODIMENTS

Embodiments of a calculation device, a calculation method, and a calculation program according to the present application will now be described in detail with reference to the accompanying drawings. It should be noted that the present invention is not limited by the embodiments described below.

Configuration of First Embodiment

Figure 1:
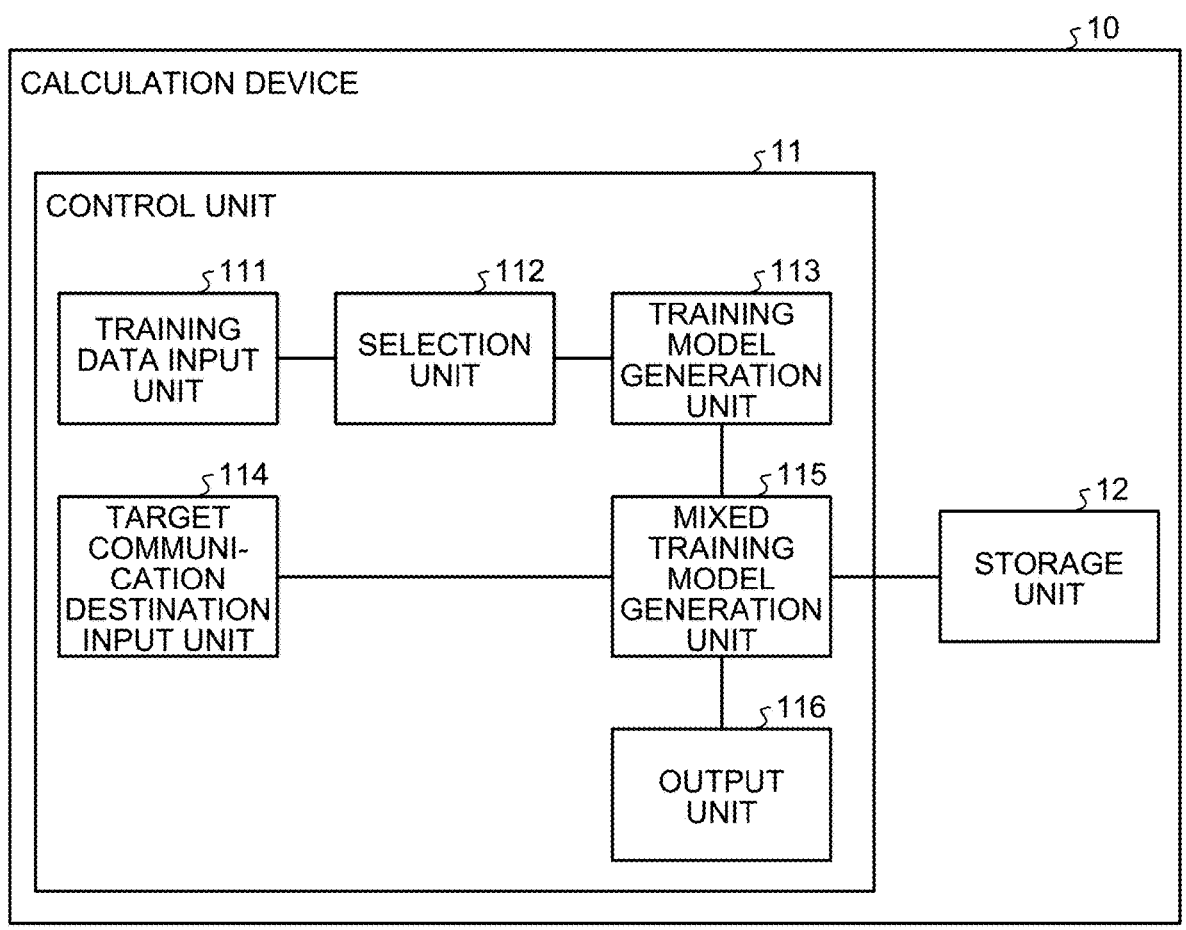
FIG. 1 is a view illustrating an example of the configuration of a calculation device according to a first embodiment.

The configuration of a calculation device according to a first embodiment will be described with reference to FIG. 1. FIG. 1 is a view illustrating an example of the configuration of the calculation device according to the first embodiment. As illustrated in FIG. 1, a calculation device 10 includes a control unit 11 and a storage unit 12.

The control unit 11 controls the whole calculation device 10. Examples of the control unit 11 include electronic circuits such as a central processing unit (CPU) and a micro processing unit (MPU) and integrated circuits such as an application specific integrated circuit (ASIC) and a field programmable gate array (FPGA). The control unit 11 includes an internal memory for storing computer programs that specify various kinds of processing procedures and control data, and executes pieces of processing using the internal memory.

The storage unit 12 corresponds to storage devices such as a hard disk drive (HDD), a solid state drive (SSD), and an optical disk. The storage unit 12 may be semiconductor memories capable of rewriting data such as a random access memory (RAM), a flash memory, and a non-volatile static random access memory (NVSRAM). The storage unit 12 stores therein an operating system (OS) executed on the calculation device 10 and various kinds of computer programs. In addition, the storage unit 12 stores therein various kinds of information used for execution of the computer programs.

The control unit 11 functions as various kinds of processing units by operation of various kinds of computer programs. For example, the control unit 11 includes a training data input unit 111, a selection unit 112, a training model generation unit 113, a target communication destination input unit 114, a mixed training model generation unit 115, and an output unit 116.

The training data input unit 111 receives input of training data. Training data is a data set that includes communication destinations known to be malignant as data. FIG. 2 is a view illustrating an example of training data according to the first embodiment. As illustrated in FIG. 2, the training data includes a serial number, a label, a type, and a communication destination. The label indicates whether each communication destination is benign or malignant. Each record of the training data is an example of data included in the data set. Hereinafter, the data included in the data set may be referred to as elements.

For example, the example in FIG. 2 indicates that a domain name called "foo.example.com" is a benign communication destination. The example in FIG. 2 also indicates that a domain name called "bar.example.net" is a malignant communication destination. As illustrated in FIG. 2, a communication destination may be represented by a domain name, and may be represented by a uniform resource locator (URL) and an Internet protocol (IP) address.

Representation of each item in the training data is not limited to the representation indicated in FIG. 2. For example, a label for benignancy and a label for malignancy may be represented by "0" and "1", respectively. In addition, the training data may include only malignant communication destinations. In that case, a label item may be omitted.

Furthermore, the training data input unit 111 receives input of training data at fixed intervals. For example, in the training data input unit 111, at daily intervals, data of malignant communication destinations collected using a sandbox and the like at that day is input as training data.

The selection unit 112 selects predetermined elements from the input training data. The selection unit 112 may select all elements, may select elements randomly, and may select elements based on a contribution ratio, which will be described later.

The training model generation unit 113 generates a model that calculates the malignant degree of the input communication destinations from each of a plurality of pieces of training data. The training model generation unit 113 generates a model from data selected by the selection unit 112.

The training model generation unit 113 can learn training data and generate a model using the known machine learning method. For example, the training model generation unit 113 generates a model using a decision tree, a neural network, a support vector machine, and the like. The training model generation unit 113 is an example of a first generation unit. Hereinafter, a model generated by the training model generation unit 113 may be referred to as a training model.

The training model generation unit 113 generates a training model in units of input of training data. For example, when training data is input at daily intervals as described above, the training model generation unit 113 generates a training model corresponding to each day.

The target communication destination input unit 114 receives input of a target communication destination list. FIG. 3 is a view illustrating an example of a target communication destination list according to the first embodiment. As illustrated in FIG. 3, the target communication destination list is a list of communication destinations that are unknown whether the communication destinations are malignant. As in the case with the training data, in the target communication destination list, a communication destination is represented by a domain name, a URL, an IP address, and the like. In addition, the communication destination list may include a communication destination included in the training data.

The mixed training model generation unit 115 gives weight to each of the training models, and generates a mixed model using the training model and the weight. In this case, the mixed training model generation unit 115 can generate a mixed model by a method of ensemble learning. Hereinafter, a model generated by the mixed training model generation unit 115 may be referred to as a mixed training model.

For example, the mixed training model generation unit 115 generates a mixed training model that calculates a weighted sum of an output value of each of the training models generated by the training model generation unit 113. When the training model generation unit 113 generates a training model using a decision tree, the mixed training model generation unit 115 can generate a mixed training model using a random forest. The mixed training model generation unit 115 is an example of a second generation unit.

For example, as described above, when the training model generation unit 113 generates a training model corresponding to each day, the mixed training model generation unit 115 can generate a mixed training model mixed with training models corresponding to a plurality of days.

In addition, the mixed training model generation unit 115 gives weight corresponding to a statistic related to training data of a generation source to each of the training models. For example, the mixed training model generation unit 115 can give larger weight as the number of records included in training data of a generation source becomes larger.

The output unit 116 calculates and outputs, using a mixed training model generated by the mixed training model generation unit 115, a malignant degree of each of the communication destinations included in a target communication destination list. FIG. 4 is a view illustrating an example of the malignant degree of target communication destinations according to the first embodiment. As illustrated in FIG. 4, the malignant degree may be represented by a numerical value of 0 or more and 1 or less. In the example of FIG. 4, a malignant degree of a communication destination called "www.example.com" indicates 0.3.

The representation method of a malignant degree is not limited to continuous values illustrated in FIG. 4. For example, the output unit 116 may represent a malignant degree by binary values of "benignancy" and "malignancy". In this case, for example, when a malignant degree calculated as a continuous value is less than 0.5, the output unit 116 may define the malignant degree of binary values as "benignancy", and when the malignant degree calculated as a continuous value is equal to and more than 0.5, the output unit 116 may define the malignant degree of binary values as "malignancy". The output unit 116 may also represent a malignant degree by discrete values other than binary values. In addition, the output unit 116 may output a malignant degree in a format designed for characteristics of a method used for generating models, and may convert the malignant degree into a format specified by a user and output the converted malignant degree.

Figure 5:
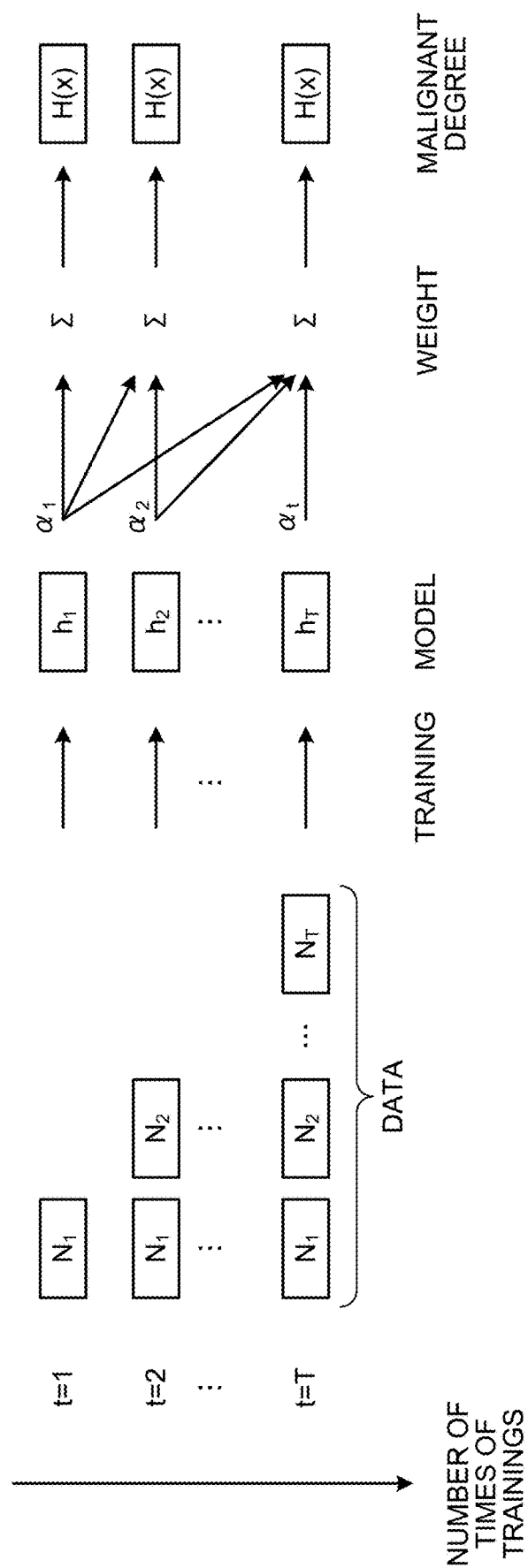
FIG. 5 is a view illustrating processing for generating mixed models according to the first embodiment.

With reference to FIG. 5, processing for generating a mixed training model by the calculation device 10 will be described in detail. FIG. 5 is a view illustrating the processing for generating a mixed training model according to the first embodiment. As illustrated in FIG. 5, the calculation device 10 receives input of training data T times. The calculation device 10 generates a mixed training model H every time training data is input, and calculates a malignant degree H(x). In H(x), x represents a target communication destination.

For example, when training data is input every day of the week, T is 7. When t=1, in other words, on the first day of the week, the calculation device 10 generates a first training model. When t=2, in other words, on the second day of the week, the calculation device 10 generates a second training model, and mixes the second training model with the first training model generated on the first day. In the same manner, when t=7, in other words, on the final day of the week, the calculation device 10 generates a seventh training model, and mixes the seventh training model with the training models generated up to the sixth day.

A communication destination included in training data is defined as $x_i \in X$, and a label indicating whether $x_i$ is malignant is defined as $y_i \in \{-1, 1\}$. Training data for T times input into the calculation device 10 are defined as $(x_1, y_1), \ldots,$ and $(x_n, y_n)$. In this case, when the size of training data of the t time(s), in other words, the number of elements is defined as $N_t$, training data up to the T times is represented as in Expression (1).

$$N_1, \ldots, N_t \ldots N_T \quad (1)$$

If t=1, $N_t=N_1$. If not, $N_t=N_{t-1}+K$. In this case, K is the size of training data added on the t times. The training model generation unit 113 generates a training model $h_t$ using $N_t$ piece(s) of training data for each value of t as indicated in Expression (2).

$$h_t: X \to \{-1,1\} \quad (2)$$

The mixed training model generation unit 115 calculates weight $\alpha_t$ of the training model $h_t$ as in Expression (3).

$$\alpha_t = \frac{N_t/D_t}{N_1/D_1 + \ldots + N_T/D_T} \quad (3)$$

In Expression (3), $D_t$ is a model dimension of the training model $h_t$. The model dimension is an index indicating complexity of a model. For example, when the training model $h_t$ uses a decision tree, the model dimension is the number of branches of the decision tree.

The mixed training model generation unit 115 generates a mixed training model H indicated in Expression (4) using the training model $h_t$ and the weight $\alpha_t$. The output unit 116 inputs a target communication destination x into the mixed training model H, and calculates the malignant degree H(x).

$$H(x) = \sum_{t=1}^{T} \alpha_t h_t(x) \quad (4)$$

In the present embodiment, the selection unit 112 selects all elements of training data or M elements that are randomly selected. Note that M is a constant number independent of t. In addition, overlapped elements may be included in the M elements.

Processing of First Embodiment

Figure 6:
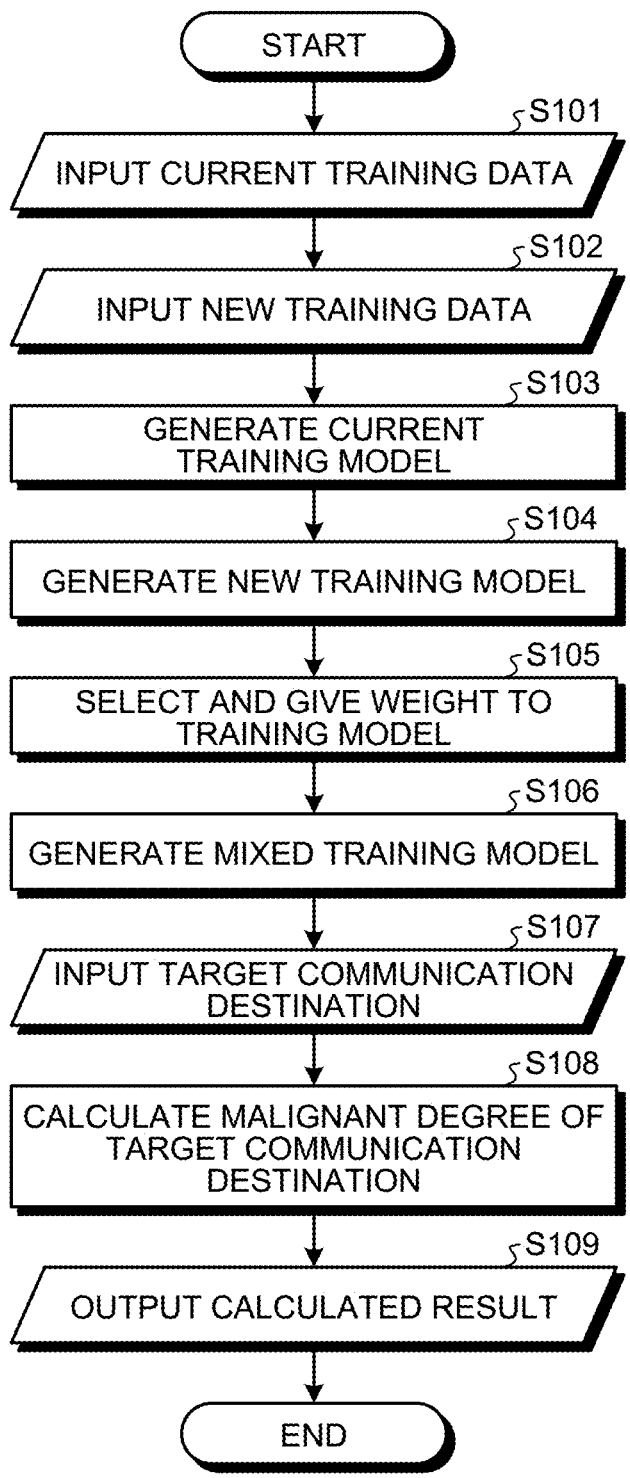
FIG. 6 is a flowchart illustrating a flow of processing of the calculation device according to the first embodiment.

With reference to FIG. 6, a flow of processing of the calculation device 10 will be described. FIG. 6 is a flowchart illustrating the flow of processing of the calculation device according to the first embodiment. In the flowchart, current training data is defined as training data up to the t−1 time(s). New training data is defined as training data of the t time(s). A current training model is defined as $h_{t-1}$. A new training model is defined as $h_t$. A mixed training model corresponds to the mixed training model H generated after training data of the t time(s) is input.

As illustrated in FIG. 6, the calculation device 10 receives input of current training data (step S101) and new training data (step S102). At step S101, the current training data may be training data received in advance and stored in the storage unit 12.

Subsequently, the calculation device 10 generates a current training model (step S103). The calculation device 10 also generates a new training model (step S104). At step S103, the current training data may be generated in advance and may be stored in the storage unit 12.

The calculation device 10 mixes, after selecting and giving weight to generated training models, the training models (step S105), and generates a mixed training model (step S106).

Furthermore, the calculation device 10 inputs a target communication destination into the mixed training model (step S107), calculates a malignant degree of the target communication destination (step S108), and outputs the calculated malignant degree (step S109).

Effect of First Embodiment

The calculation device 10 receives input of a plurality of pieces of training data including communication destinations known to be malignant as data. In addition, the calculation device 10 generates a model that calculates the malignant degree of the input communication destinations from each piece of the training data. Furthermore, the calculation device 10 gives weight to each of the models, and generates a mixed model using the model and the weight.

In the conventional method for calculating a malignant degree using supervised machine learning, after new training data was obtained, a current training model was discarded and a new training model was generated using the new training data. In this manner, when the new training data lacked a communication destination related to a target communication destination and a communication destination acting as noise of a training model was mixed, there was a case where a new training model could not correctly calculate a malignant degree of a communication destination that the current training model was able to correctly calculate. Thus, in the conventional method for calculating a malignant degree, when a malignant communication destination is changed, accuracy is reduced.

By contrast, when new training data is added, the calculation device 10 of the present embodiment gives weight as appropriate and mixes a current training model with the new training model without discarding the current training model. In this manner, the calculation device 10 can specify a malignant communication destination with high accuracy even when the malignant communication destination is changed.

The calculation device 10 gives weight corresponding to a statistic related to training data of a generation source to each of the models. For example, it is considered that accuracy of a generated model is improved as the size of training data used for training is larger. Thus, the calculation device 10 reflects a statistic of the data size and the like in weight, so as to allow, in a mixed training model, a model with higher accuracy to have a larger effect.

Second Embodiment

A second embodiment will be described. The basic configuration and processing of the calculation device 10 according to the second embodiment are the same as the configuration and processing of the calculation device 10 according to the first embodiment. Hereinafter, in the configuration and processing of the calculation device 10 according to the second embodiment, explanation of the configuration and processing that are the same as those of the calculation device 10 according to the first embodiment is omitted as appropriate.

In the first embodiment, the calculation device 10 gives weight to each training model. By contrast, in the second embodiment, the calculation device 10 gives weight to not only each training model but also each element of training data of a generation source.

The calculation device 10 can give weight to each element of training data corresponding to a contribution ratio to calculation of a malignant degree. In this case, the selection unit 112 selects, from data included in a plurality of pieces of training data, a given number of data in descending order of a contribution ratio to calculation of a malignant degree using a model.

Figure 7:
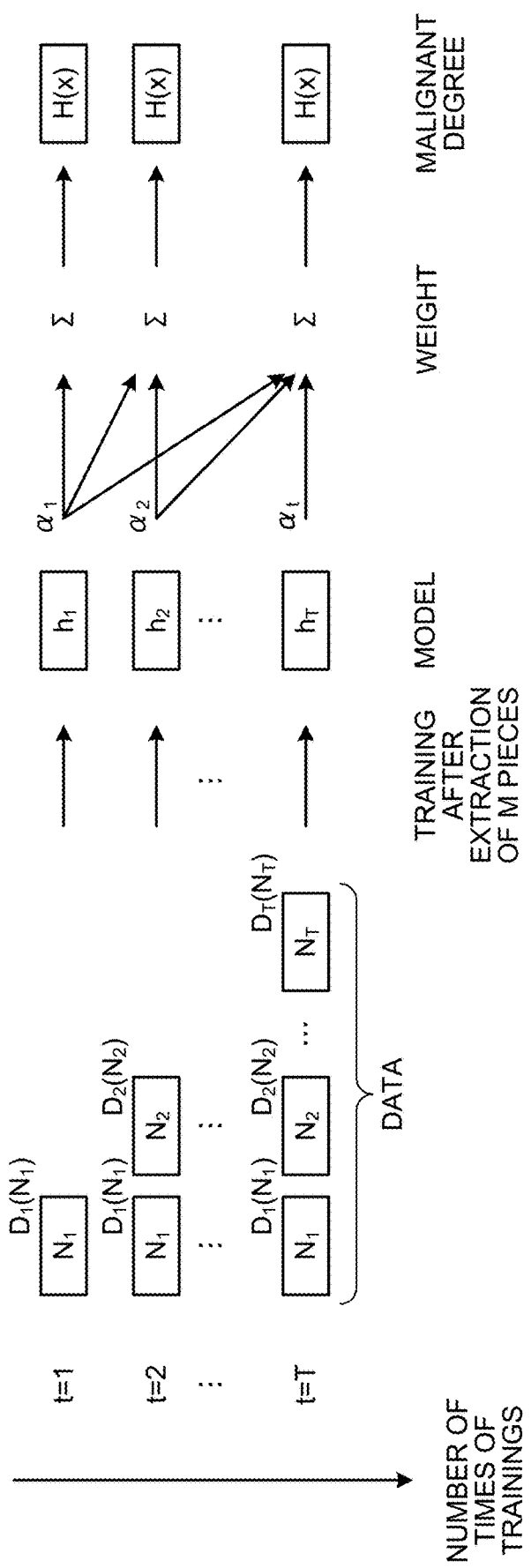
FIG. 7 is a view illustrating processing for generating mixed models according to a second embodiment.

With reference to FIG. 7, processing for generating a mixed training model by the calculation device 10 will be described in detail. FIG. 7 is a view illustrating processing for generating a mixed model according to the second embodiment. Unlike the example in FIG. 5, in the example in FIG. 7, weight $D_t(k)$ is set to each training data. In $D_t(k)$, k indicates an index identifying elements of training data.

The calculation device 10 may receive input of training data up to t time(s) or up to T times at once, and may sequentially receive input of the training data for each t. In the second embodiment, the calculation device 10 is made to sequentially receive input of training data.

In this case, the training data input unit 111 sequentially receives input of training data. Every time the training data input unit 111 receives input of training data, the selection unit 112 selects, about each data included in the input training data, a given number of data in descending order of a contribution ratio to calculation of a malignant degree when a model having been generated by the training model generation unit 113 is used. Every time the selection unit 112 selects data, the training model generation unit 113 generates a model based on the selected data. Every time the training model generation unit 113 generates a model, the mixed training model generation unit 115 mixes, after giving weight to the generated model so that the generated model becomes larger as an error function becomes smaller, the generated model with a model that has been generated.

The training model generation unit 113 calculates the weight $D_1(k)$ when t=1 as in Expression (5).

$$D_1(k) = \frac{1}{N_1}, k = 1, \dots N_1 \tag{5}$$

The training model generation unit 113 calculates an error function $s_t$ used when a training model of the t time(s) is generated as in Expression (6). In Expression (6), Z indicates an element that allows $\varepsilon_t$ to be 0 or more and 1 or less. For example, Z=1/n.

$$\varepsilon_t = Z \sum_{i=1}^{n} [h_t(x_i) \neq y_i] \tag{6}$$

The mixed training model generation unit 115 calculates weight $\alpha_t$ of the training model $h_t$ as in Expression (7).

$$\alpha_t = \frac{1}{2} \ln \frac{1 - \varepsilon_t}{\varepsilon_t} \tag{7}$$

In this manner, $\alpha_t$ is larger as an error function is smaller and is smaller as the error function is larger. Thus, the calculation device 10 can allow, in a mixed training model, a model with higher accuracy to have a larger effect.

The training model generation unit 113 calculates the weight $D_t(k)$ when t=1 as in Expression (8). In Expression (8), when $N_{t-1}/N_t$, in other words, when k corresponds to new training data, which element has a larger contribution ratio is unknown. Thus, weight of each element becomes equal. In Expression (8), $Z_t$ is an element for normalizing an error function so that a total value of $D_t(k)$ is $N_{t-1}/N_t$ when $1 \leq k \leq N_{t-1}$.

$$D_t(k) = \begin{cases} \dfrac{N_{t-1}}{N_t} \dfrac{D_{t-1}(k) e^{-\alpha_{t-1} y_k h_{t-1}(x_k)}}{Z_t}, & (1 \leq k \leq N_{t-1}) \\ \dfrac{1}{N_t}, & (N_{t-1} < k \leq N_t) \end{cases} \tag{8}$$

By contrast, when $1 \leq k \leq N_{t-1}$, in other words, when k corresponds to the current training data, the weight $D_t(k)$ is affected by a contribution ratio of each element in the current training model. Specifically, as a contribution ratio of the element k in the current training model $h_{t-1}$ generated at the time of inputting training data on the t−1 time(s) is larger, the weight $D_t(k)$ is larger.

The selection unit 112 selects M elements based on the weight $D_t(k)$. For example, the selection unit 112 can select M elements in descending order of the $D_t(k)$. The training model generation unit 113 generates, after giving the weight $D_t(k)$ to each element selected by the selection unit 112 for each value of t, the training model $h_t$ using $N_t$ pieces of training data as indicated in Expression (9).

$$h_t:x \to \{-1,1\} \quad (9)$$

The mixed training model generation unit 115 generates the mixed training model H indicated in Expression (10) using the training model $h_t$ and the weight $\alpha_t$. The output unit 116 inputs a target communication destination x into the mixed training model H, and calculates the malignant degree H(x).

$$H(x) = \sum_{t=1}^{T} \alpha_t h_t(x) \quad (10)$$

Processing of Second Embodiment

Figure 8:
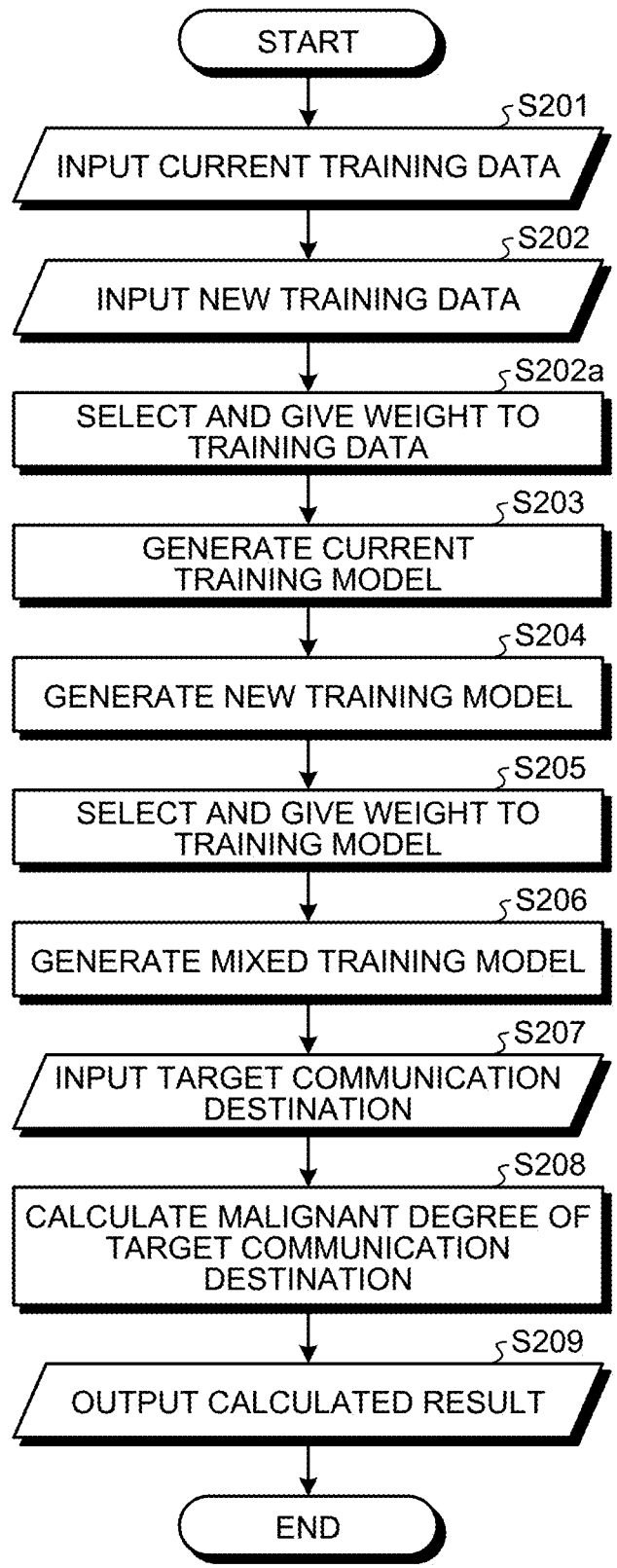
FIG. 8 is a flowchart illustrating a flow of processing of the calculation device according to the second embodiment.

With reference to FIG. 8, a flow of processing of the calculation device 10 will be described. FIG. 8 is a flowchart illustrating the flow of processing of the calculation device according to the second embodiment. As illustrated in FIG. 8, the calculation device 10 receives input of current training data (step S201) and new training data (step S202).

The calculation device 10 calculates weight of each element of the new training data and the current training data, and selects and gives weight to an element included in each data (step S202a).

Subsequently, the calculation device 10 generates a current training model (step S203). The calculation device 10 also generates a new training model (step S204). At steps S203 and S204, the calculation device 10 generates the current training model and the new training model using the elements selected and gave weight to at step S202a.

The calculation device 10 mixes, after selecting and giving weight to the generated training models, the training models (step S205), and generates a mixed training model (step S206).

Furthermore, the calculation device 10 inputs a target communication destination into the mixed training model (step S207), calculates a malignant degree of the target communication destination (step S208), and outputs the calculated malignant degree (step S209).

Effect of Second Embodiment

The selection unit 112 selects, from data included in a plurality of pieces of training data, a given number of data in descending order of a contribution ratio to calculation of a malignant degree using a model. In this manner, the calculation device 10 can propagate information useful in the past or in the present and can use the information for generation of the latest training model. In addition, the calculation device 10 can generate a model with higher accuracy each time generation is repeated.

In this case, the training data input unit 111 sequentially receives input of training data. Every time the training data input unit 111 receives input of training data, the selection unit 112 selects, about each data included in the input training data, a given number of data in descending order of a contribution ratio to calculation of a malignant degree when a model having been generated by the training model generation unit 113 is used. Every time the selection unit 112 selects data, the training model generation unit 113 generates a model based on the selected data. Every time the training model generation unit 113 generates a model, the mixed training model generation unit 115 mixes, after giving weight to the generated model so that the generated model becomes larger as an error function becomes smaller, the generated model with a model that has been generated.

In this manner, the calculation device 10 can calculate, even though how many times training data is input at a maximum is unknown, weight based on the sequentially input training data.

System Configuration and the Like

Components in each of the illustrated devices are functionally conceptual, and are not necessarily configured physically as illustrated. In other words, a specific embodiment of distributing/integrating each of the devices is not limited to the illustrated ones, and all of or a part of the devices can be configured to be functionally or physically distributed/integrated in a certain unit depending on various kinds of loads, use situations, and the like. In addition, all of or a certain part of the processing functions executed by each of the devices may be implemented by a central processing unit (CPU) and a computer program analyzed and executed by the CPU, or may be implemented as hardware of the wired logic.

Out of the pieces of processing described in the present embodiment, all of or a part of the pieces of processing described as automatically performed processing can be performed manually, or all of or a part of the pieces of processing described as manually performed processing can be performed automatically by a publicly known method. Except as otherwise specifically described, any modifications can be made on processing procedures, control procedures, specific names, and information including various kinds of data and parameters illustrated in the specifications and drawings.

Computer Program

As one embodiment, the calculation device 10 can be implemented by installing a calculation program that executes the model generation and malignant degree calculation as packaged software and online software into a desired computer. For example, by causing an information-processing device to execute the calculation program, the information-processing device can function as the calculation device 10. The information-processing device mentioned here includes a desktop or a laptop personal computer. Besides, mobile communication terminals such as a smartphone, a mobile phone, and a personal handyphone system (PHS), slate terminals such as a personal digital assistant (PDA), and the like are in the category of the information-processing device.

The calculation device 10 defines a terminal device used by a user as a client, and can be implemented as a calculation server device that provides a service related to the model generation and malignant degree calculation to the client. For example, the calculation server device is implemented as a server device that provides a calculation service in which training data is defined as input and a mixed training model is defined as output. In this case, the calculation server device may be implemented as a Web server, and may be implemented as a cloud that provides a service related to the model generation and malignant degree calculation by outsourcing.

Figure 9:
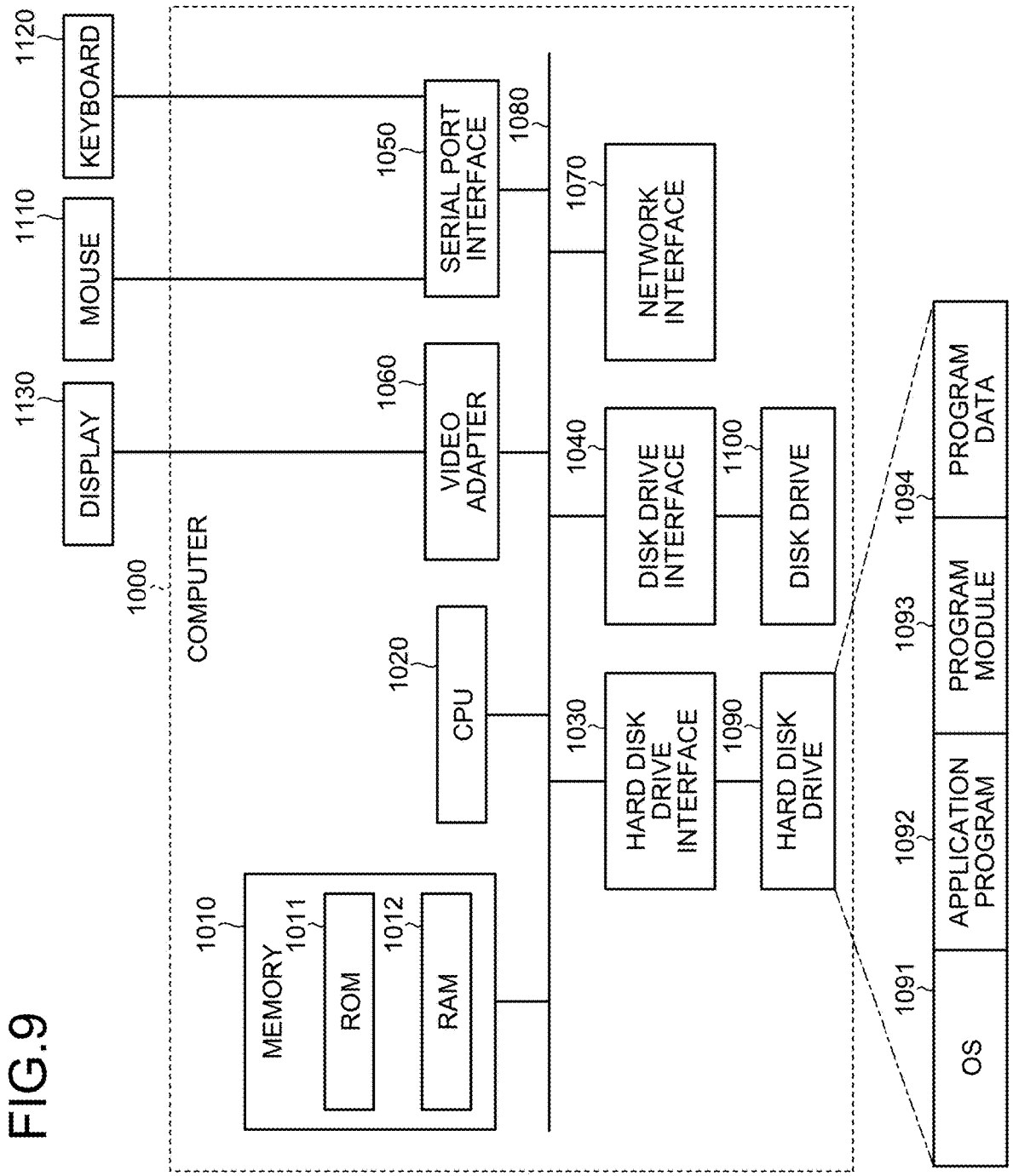
FIG. 9 is a view illustrating an example of a computer that executes a calculation program.

FIG. 9 is a view illustrating an example of a computer that executes a calculation program. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. Each of the units is connected to each other by a bus 1080.

The memory 1010 includes a read only memory (ROM) 1011 and a RAM 1012. The ROM 1011 stores therein, for example, a boot program of a basic input output system (BIOS) and the like. The hard disk drive interface 1030 is connected to a hard disk drive 1090. The disk drive interface 1040 is connected to a disk drive 1100. For example, attachable/detachable storage media such as a magnetic disk and an optical disk are inserted into the disk drive 1100. The serial port interface 1050 is connected to, for example, a mouse 1110 and a keyboard 1120. The video adapter 1060 is connected to, for example, a display 1130.

The hard disk drive 1090 stores therein, for example, an OS 1091, an application program 1092, a program module 1093, and program data 1094. In other words, a computer program specifying pieces of processing of the calculation device 10 is implemented as the program module 1093 in which a computer-executable code is described. The program module 1093 is stored in, for example, the hard disk drive 1090. For example, the program module 1093 for executing processing the same as the function configuration in the calculation device 10 is stored in the hard disk drive 1090. The hard disk drive 1090 may be replaced by an SSD.

Setting data used in processing of the embodiments described above is stored as the program data 1094 in, for example, the memory 1010 and the hard disk drive 1090. The CPU 1020 reads the program module 1093 and the program data 1094 stored in the memory 1010 and the hard disk drive 1090 into the RAM 1012 as needed, and executes processing of the embodiments described above.

The program module 1093 and the program data 1094 are not always stored in the hard disk drive 1090, and may be stored in, for example, an attachable/detachable storage medium and be read by the CPU 1020 through the disk drive 1100 and the like. Or the program module 1093 and the program data 1094 may be stored in the other computer connected through networks (a local area network (LAN), a wide area network (WAN), and the like). The program module 1093 and the program data 1094 may be read from the other computer by the CPU 1020 through the network interface 1070.

REFERENCE SIGNS LIST

10 Calculation device
11 Control unit
12 Storage unit
111 Training data input unit
112 Selection unit
113 Training model generation unit
114 Target communication destination input unit
115 Mixed training model generation unit
116 Output unit

The invention claimed is:

1. A calculation device comprising:
a memory; and
a processor coupled to the memory and configured to:
receive input of a plurality of data sets including a communication destination known to be malignant, input of each of the plurality of data sets being spaced apart by a predetermined time interval;
generate, upon receipt of each of the plurality of data sets, a model that calculates a malignant degree of an input communication destination from a respective one of the data sets received;
give weight to each model generated and generate a mixed model using each model generated and the weight;
determine whether at least one of the plurality of data sets corresponds to a communication destination that is malignant or not using the mixed model; and
output, to a display, an indication of whether the at least one of the plurality of data sets corresponds to a communication destination that is malignant.

2. The calculation device according to claim 1, wherein the weight given to each of the models corresponds to a statistic related to a data set of a generation source.

3. The calculation device according to claim 1, wherein the processor is further configured to:
select, from data included in the data sets, a given number of data in descending order of a contribution ratio to calculation of a malignant degree using the model, and generate the model from data selected.

4. The calculation device according to claim 3, wherein the processor is further configured to:
sequentially receive input of the data sets,
every time input of the data sets is received, select, about each data included in the input data sets, a given number of data in descending order of a contribution ratio to calculation of a malignant degree when a model generated by the processor is used,
every time data is selected, generate the model based on the selected data, and
every time a model is generated, mix, after giving weight to the generated model so that the generated model becomes larger as an error function becomes smaller, the generated model with another model that has been generated.

5. The calculation device according to claim 1, wherein the predetermined time interval is one day.

6. The calculation device according to claim 5, wherein the mixed model is generated from a plurality of models, each calculated for one of a plurality of successive days.

7. The calculation device according to claim 1, wherein the processor generates the model using a neural network that operates on the plurality of data sets.

8. The calculation device according to claim 1, wherein the mixed model is generated through ensemble learning based on each model generated.

9. The calculation device according to claim 8, wherein the circuitry calculates the mixed model as a weighted sum of outputs of each model generated.

10. The calculation device according to claim 1, wherein the indication of whether the at least one of the plurality of data sets corresponds to a communication destination that is malignant is a predetermined binary value indicating malignancy or benignancy.

11. The calculation device according to claim 1, wherein the processor is further configured to output a malignant degree of the at least one of the plurality of data sets.

12. The calculation device according to claim 1, wherein the processor is configured to calculate the weight as:

$$\alpha_t = \frac{N_t/D_t}{N_1/D_1 + \ldots + N_T/D_T}$$

where T is a number of data sets received, N is a number of elements in each data set, D is a dimension of the model, and α is the weight.

13. The calculation device according to claim 1, wherein the processor is further configured to weight each of the plurality of data sets.

14. The calculation device according to claim 13, wherein the processor is configured to calculate weights for each of the plurality of data sets according to:

$$D_1(k) = \frac{1}{N_1}, k = 1, \ldots N_1$$

Where N is a number of elements in each of the plurality of data sets.

15. A calculation method that is executed by a computer, the calculation method comprising:
   receiving input of a plurality of data sets including a communication destination known to be malignant, input of each of the plurality of data sets being spaced apart by a predetermined time interval;
   generating, upon receipt of each of the plurality of data sets, a model that calculates a malignant degree of an input communication destination from a respective one of the data sets received;
   giving weight to each model generated and generating a mixed model using each model generated and the weight;
   determining whether at least one of the plurality of data sets corresponds to a communication destination that is malignant or not using the mixed model; and
   outputting, to a display, an indication of whether the at least one of the plurality of data sets corresponds to a communication destination that is malignant.

16. A non-transitory computer-readable recording medium having stored therein a program, for calculating, that causes a computer to execute a process, comprising:
   receiving input of a plurality of data sets including a communication destination known to be malignant, input of each of the plurality of data sets being spaced apart by a predetermined time interval;
   generating, upon receipt of each of the plurality of data sets, a model that calculates a malignant degree of an input communication destination from a respective one of the data sets received;
   giving weight to each model generated and generating a mixed model using each model generated and the weight;
   determining whether at least one of the plurality of data sets corresponds to a communication destination that is malignant or not using the mixed model; and
   outputting, to a display, an indication of whether the at least one of the plurality of data sets corresponds to a communication destination that is malignant.

\* \* \* \* \*